(No Model.)
E. H. TRAUT.
KITCHEN CABINET.
No. 527,629. Patented Oct. 16, 1894.
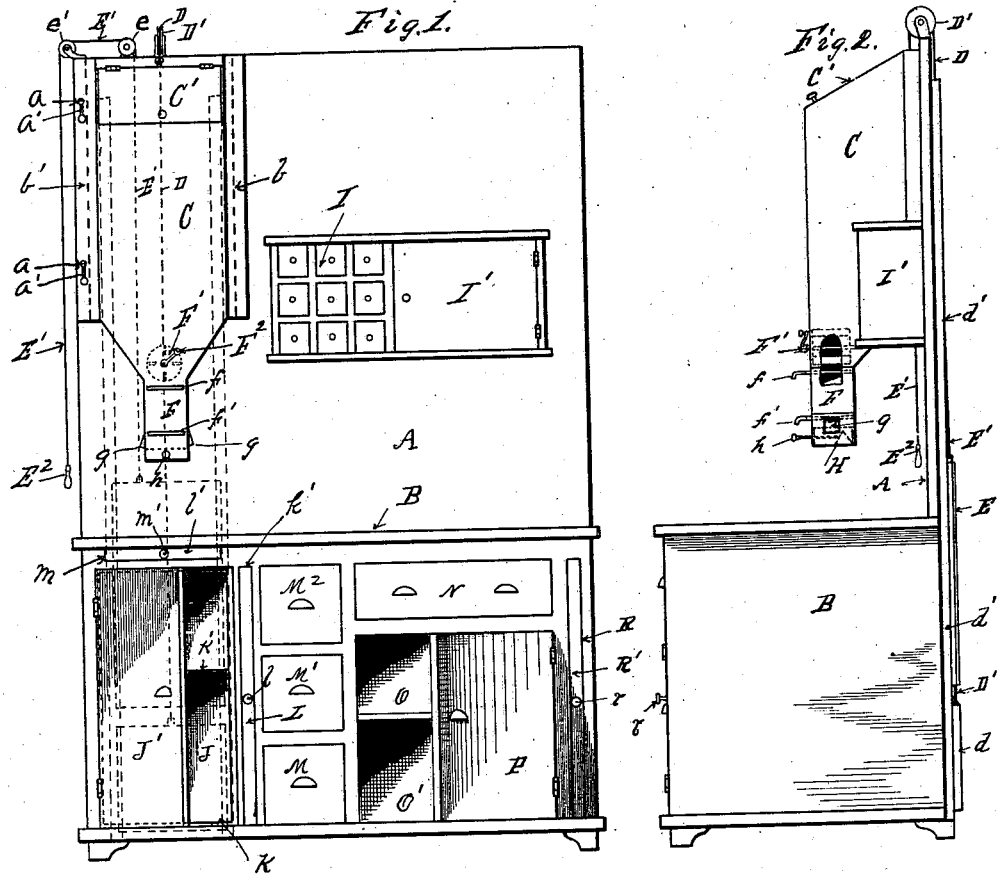
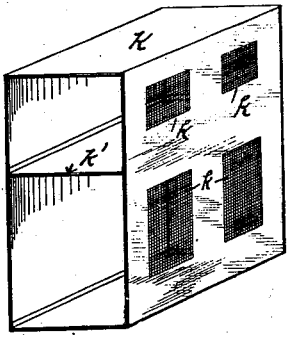
WITNESSES.
F. Einfeldt
A. L. Jackson
INVENTOR.
Ezra H. Traut
By A. Sturgis
atty.

UNITED STATES PATENT OFFICE.

EZRA H. TRAUT, OF ERIE, PENNSYLVANIA.

KITCHEN-CABINET.

SPECIFICATION forming part of Letters Patent No. 527,629, dated October 16, 1894.

Application filed January 13, 1894. Serial No. 496,731. (No model.)

*To all whom it may concern:*

Be it known that I, EZRA H. TRAUT, a citizen of the United States, residing at the city of Erie, in the county of Erie and State of Pennsylvania, have invented certain new and useful Improvements in Kitchen-Cabinets; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in kitchen cabinets, hereinafter set forth and explained, and illustrated in the accompanying drawings, in which—

Figure 1. is a front view in elevation of my improved kitchen cabinet. Fig. 2. is an end view in elevation of the same. Fig. 3. is a perspective view of the removable lining of the bread and cake cupboard of my improved kitchen cabinet. Fig. 4. is a perspective view of the removable dampener for the bread and cake cupboard. Fig. 5. is a view in perspective of the flour sifter (parts thereof being broken away).

In the construction of my improved kitchen cabinet, A is the upright and B the lower portion thereof. At one side of the upright portion A are secured vertical guides $b$ and $b'$, one of which $b'$ is removably secured thereto by means of screws $a, a$, passing through slotted openings $a'$ $a'$ in the guide $b'$ into the upright portion A, so that it can be readily removed. Between the guides $b$ and $b'$ is a vertically movable flour box C adapted to slide up and down freely between said guides $b$ and $b'$. To support this flour box when empty in its normally upraised position, a cord D secured thereto passes over a pulley D' at the top of, and down behind the upright portion A of the cabinet, where it is provided with a weight $d$, sliding vertically between guides $d'$. Sufficient to counterbalance the empty box, above the weight $d$ and also sliding vertically between the guides $d'$ is a second weight adapted to counterbalance the weight of the flour the box C will hold, which weight E normally rests upon the top of the weight $d$. From this weight E a cord E' passes up over pulleys $e$ and $e'$ at the top of and down at the end of the upright portion A of the cabinet, where it terminates in a handle or knob $E^2$, by means of which the weight E can be lifted and the flour box C lowered when desired for filling the same.

The top of the flour box C is provided with a sloping cover C' hinged thereto, and the lower part of the box C is hopper shaped terminating in a square spout F. Just above the spout F, I place a rotating agitator F' provided with a crank $F^2$, by means whereof the flour can be loosened up, so that it will pass down into the spout F freely. In the spout F, I place two cut-off slides $f$ and $f'$ by means whereof a given quantity of flour can be measured and discharged therefrom, and in the lower end of the spout F, I place a removable sifter G, which is adapted to pass up inside of the lower end of the spout F, until it is engaged by spring catches $g, g$, which pass into and engage openings $g'$ $g'$ in the sides of the sifter G. This sifter (see Fig. 5), is provided with a gauze bottom G', over which a triangular wire frame H travels, this frame H being provided with a handle and knob $h$, by means whereof it can be moved back and forth over the sifter bottom G'.

At one side of the flour box C, I secure to the upright portion A of the cabinet a case of spice drawers I, and a small extract cupboard I', and at one end, (preferably the left hand end) of the lower part B of the cabinet, I make a cupboard J, the door J' of which is shown partially open in Fig. 1. Within this cupboard J, I place a removable lining K (see Fig. 3) preferably of tin, which fills the entire cupboard, and is provided with one or more shelves K', and the right hand side of this lining is provided with gauze covered openings $k$. Immediately at the right side of the cupboard J, I make a vertical opening $k'$ within which I place a dampening board L (see Fig. 4) covered on one side with cloth, felt or some other substance L' suitable to retain dampness, which, when in place in the cabinet is immediately adjacent to the gauze covered openings in the cupboard lining K, and through which openings $k$ the dampness passes from the dampening substance L' to bread, cake or other materials placed within the cupboard J. A knob $l$ is provided on the outer edge of the dampening board L by means whereof it can be withdrawn from the recess $k'$. Directly above the top of the cupboard J, I provide a sliding shelf $l'$ which is adapted to move in and out of a recess $m$, directly under the top of the lower part B of the cabinet; a knob $m'$ being provided by means of which it can be drawn out. At the right of the cupboard J and the dampening board L, I place in the lower part B of the cabinet, drawers M, M' M² and N, and below the drawer N I make open shelves O, O' and a pot cupboard P, and to the right of the pot cupboard P, I make a vertical recess R, within which I place a removable bread board R' provided with a knob $r$ by means whereof it can be withdrawn from the recess R.

Having thus fully described my invention, so as to enable others to construct and use the same, what I claim as new, and desire to secure by Letters Patent of the United States, is—

1. The combination in a kitchen cabinet, consisting of a base section and an upright section, of a flour box mounted in vertical guides on the front of the upright section of the cabinet, counterbalance weights connected with said flour box and passing down behind the cabinet, a rotary flour agitator in the lower part of the flour box, a spout on the lower end of the flour box, two cut offs in said spout for measuring a given quantity of flour, and a transversely moving sifter scraper moving across a sifter removably secured to the lower end of said spout, substantially as and for the purpose set forth.

2. The combination in a kitchen cabinet, of a bread and cake cupboard in the lower part of such cabinet, a removable lining in said cupboard, gauze covered openings in one side of said removable lining, and a dampening board fitting into the cabinet adjacent to the gauze covered openings in the cupboard lining, substantially as and for the purpose set forth.

In testimony whereof I affix my signature in presence of two witnesses.

EZRA H. TRAUT.

Witnesses:
 ISADOR SOBEL,
 B. B. BROWN.